United States Patent [19]
Smallwood

[11] Patent Number: 5,715,917
[45] Date of Patent: Feb. 10, 1998

[54] COMBINATION ARTICULATED VEHICLE DAMPING METHOD

[76] Inventor: Leonard F. Smallwood, P.O. Box 70, Schertz, Tex. 78154-0070

[21] Appl. No.: 751,315

[22] Filed: Nov. 18, 1996

Related U.S. Application Data

[62] Division of Ser. No. 463,984, Jun. 5, 1995, Pat. No. 5,630,605.

[51] Int. Cl.$^6$ ........................................... B62D 3/10
[52] U.S. Cl. ............... 188/377; 280/432; 280/446.1; 280/784; 296/35.2; 296/189
[58] Field of Search ........................ 280/432, 400, 280/423.1, 446.1, 449, 450, 451, 504, 784; 188/371, 377; 296/35.2, 189; 180/14.1; 293/133; 213/1

[56] References Cited

U.S. PATENT DOCUMENTS

| | | |
|---|---|---|
| 2,550,632 | 5/1951 | Young et al. ........................ 280/432 |
| 3,633,934 | 1/1972 | Wilfert . |
| 3,950,011 | 4/1976 | Yamanaka . |
| 4,723,879 | 2/1988 | Holt .......................... 267/141.1 X |
| 4,856,621 | 8/1989 | Yoder ....................... 280/446.1 X |
| 5,232,239 | 8/1993 | Hawkins et al. ............ 280/446.1 X |

FOREIGN PATENT DOCUMENTS

| | | | |
|---|---|---|---|
| 61-196839 | 9/1986 | Japan ........................... 188/377 |
| 2-203033 | 8/1990 | Japan ........................... 188/377 |

*Primary Examiner*—Victor E. Johnson
*Attorney, Agent, or Firm*—Akard & Griffin

[57] ABSTRACT

A combination articulated vehicle damping method for absorbing the kinetic energy of the trail vehicle during a collision that includes crushing a damping material, positioned at a connection of the lead vehicle and the trail vehicle of a combination articulated vehicle, during the collision.

10 Claims, 2 Drawing Sheets

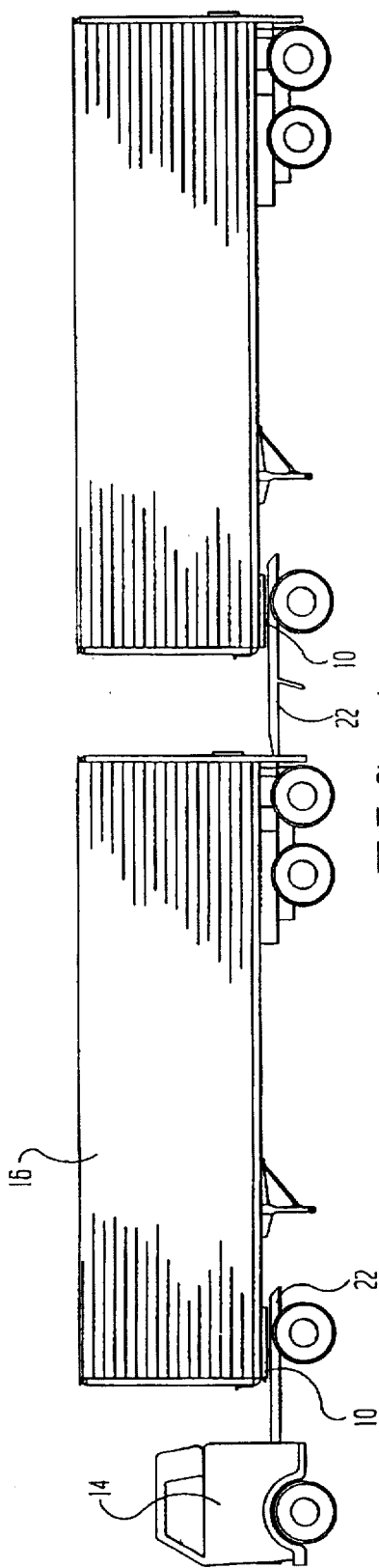
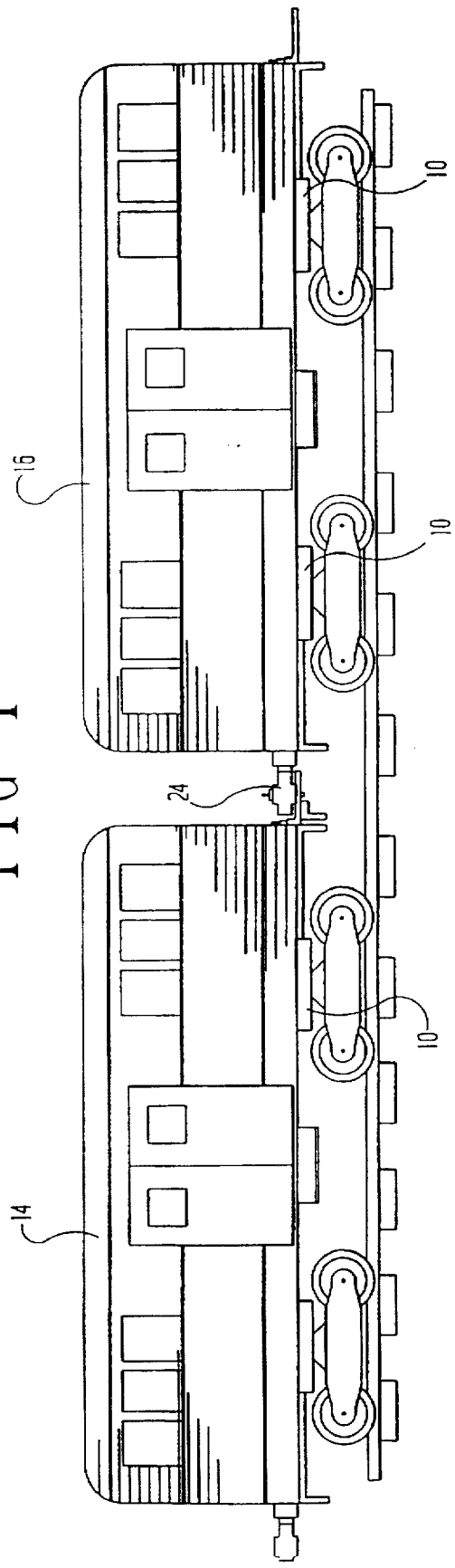

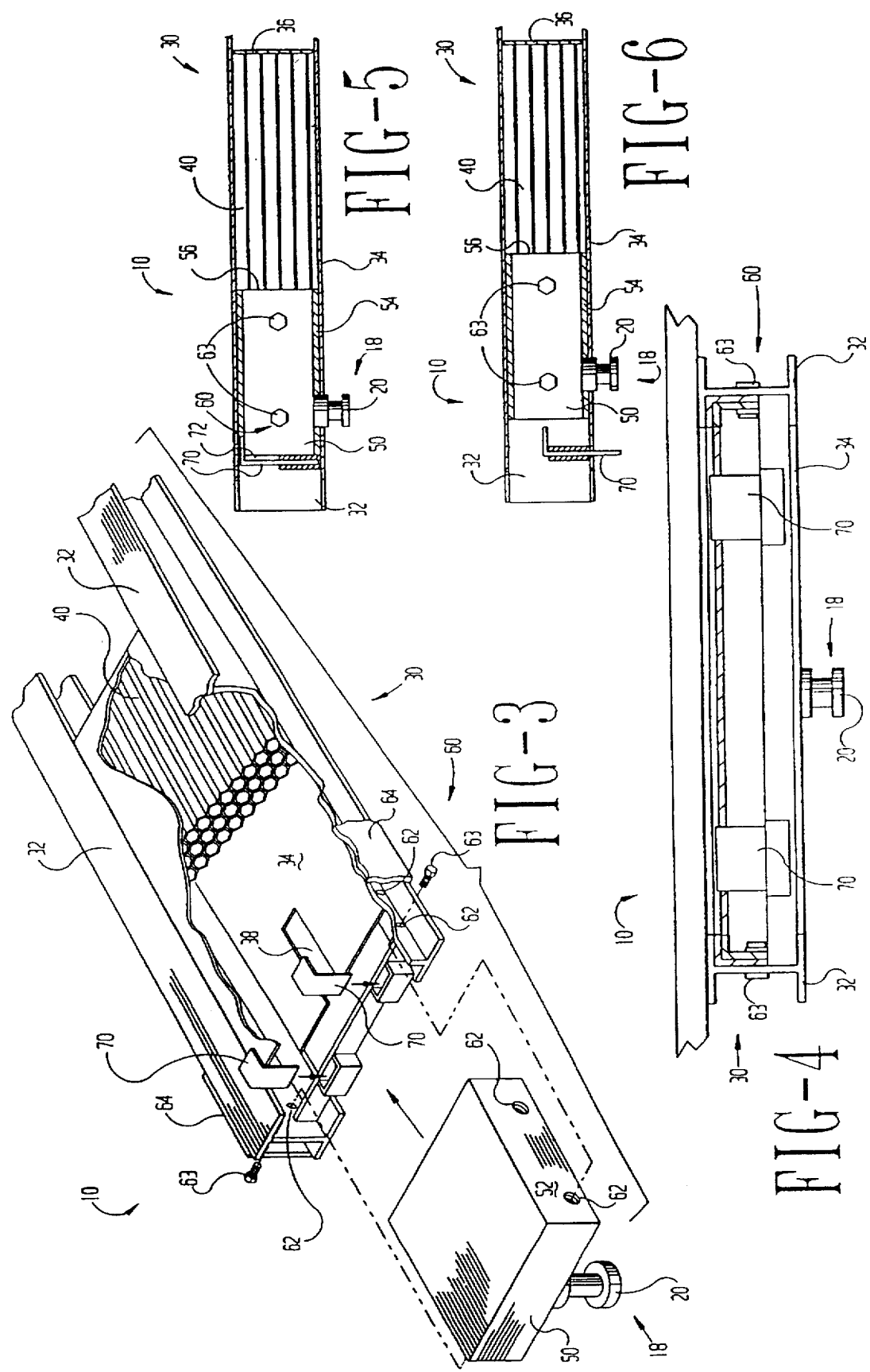

ly installed and maintained damping system that is more efficient than prior efforts. Also, the present invention provides damping without destruction of the combination articulated vehicle components, as prior efforts do, thereby allowing for lower cost of repair.

COMBINATION ARTICULATED VEHICLE DAMPING METHOD

This is a division of application Ser. No. 08/463,984, filed Jun. 5, 1995, and now U.S. Pat. No. 5,630,605.

BACKGROUND OF THE INVENTION

1. Field of Invention

The present invention relates to a safety method for combination articulated vehicles, such as semi-trailer trucks, full trailer trucks, travel trailers and other trailers, trains, and subways. More particularly, the present invention relates to a method of dissipating the kinetic energy stored in a trail vehicle during a collision that uses a damping system placed between the lead and trail vehicles in a combination articulated vehicle.

Generally, combination articulated vehicles are two or more vehicles attached together to form a chain of vehicles and are used primarily to transport cargo or passengers. One example of a combination articulated vehicle is a semi-trailer truck in which a truck is coupled to a trailer. By attaching an additional trailer to the semi-trailer truck, the combination articulated vehicle becomes a full-trailer truck made up of a chain of three or more vehicles. In like manner, trains and subways are combination articulated vehicles made up of engines and cars coupled together in a chain of vehicles. Other examples include vehicles having a trailer, such as a travel trailer or horse trailer, in tow. In order to simplify the discussion, the vehicles in a combination articulated vehicle are taken two at a time and referred to as the lead vehicle and the trail vehicle. As the name suggests, the lead vehicle is the vehicle in front when the combination articulated vehicle is moving in the forward direction (e.g. the truck in a semi-trailer truck). Similarly, the trail vehicle is the towed vehicle in a combination articulated vehicle (e.g. the trailer in a semi-trailer truck). One aspect of all combination articulated vehicles is that they must have a gap between the lead and trail vehicles to permit the combination articulated vehicle to turn.

Accidents involving these vehicles often result in extensive property damage, injury, and loss of life. One reason accidents involving combination articulated vehicles are particularly destructive is that the trail vehicles carry substantial weight. When moving, this increased weight in the trail vehicle greatly increases the total kinetic energy of the combination articulated vehicle. Thus, when a combination articulated vehicle collides with another object, the kinetic energy of the trail vehicle transfers to the lead vehicle thereby increasing the kinetic energy of the collision. The increased kinetic energy subjects the operator of the combination articulated vehicle to great accelerations. Additionally, the increased kinetic energy results in greater collision impact forces causing greater damage. The addition of the increased impact forces endangers both the operator of the combination articulated vehicle and others involved in the collision.

2. Related Art

A combination articulated vehicle safety system is known to the prior art and is shown in U.S. Pat No. 3,950,011 that issued to Yamanaka on Apr. 13, 1976. However, this system does not provide a truly simple remedy for the problem of absorbing the kinetic energy of a trail vehicle during the collision of a combination articulated vehicle. The system shown in Yamanaka teaches the use of a friction plate between the trailer and truck of a semi-trailer truck combined with plastic deformation of the frame of the truck to provide damping. Also, Yamanaka reveals the use of a metal rod designed to plastically deform and absorb kinetic energy during a collision. Further, Yamanaka shows the use of pneumatic and hydraulic cylinders to absorb the kinetic energy of the trailer.

Although Yamanaka provides a safety system for combination articulated vehicles, its application requires destruction of the truck frame by design. The design concentrates the load at a narrow point and, thereby, mandates extensive strength and weight of the truck frame; and the design provides for limited damping travel. In addition, implementation of the Yamanaka safety device requires extensive redesign of both the truck and the trailer and may not yield dependable results if oil or water accumulates on the friction plate. Also, Yamanaka has no application to other combination articulated vehicles such as standard trailers, trains, and subways.

A related effort is U.S. Pat. No. 3,633,934 that issued to Wilfert on Jan. 11, 1972. Wilfert teaches the use of a piston to deform an energy dissipating medium held within a cylinder to prevent transmission of collision forces to the passenger compartment of a passenger automobile. While not related to combination articulated vehicles but to passenger automobiles, Wilfert aids in understanding the present invention.

In view of the known combination articulated vehicle safety system, the present invention represents an improvement to provide a damping system that is easily applied to existing combination articulated vehicles with little modification. Additionally, the present invention provides a low cost, easily installed and maintained damping system that is more efficient than prior efforts. Also, the present invention provides damping without destruction of the combination articulated vehicle components, as prior efforts do, thereby allowing for lower cost of repair.

SUMMARY OF THE INVENTION

To achieve such improvements, the present invention is a method of dissipating kinetic energy stored in a trail vehicle of a combination articulated vehicle during collision. This is accomplished by affixing a damping material to the trail vehicle, positioning a slidably mounted slider frame and the damping material so that, when the slider frame moves relative to the trail vehicle during collision, the slider frame deforms the damping material, mounting a trail vehicle connector means on the slider frame, and fastening the slider frame to prevent its movement relative to the trail vehicle until exposed to a predetermined force.

In addition, the method may be accomplished by crushing a damping material, positioned at a connection of the trail vehicle to the lead vehicle, during the collision.

Further, the invention is a method of reducing the damage caused by a collision of a combination articulated vehicle that comprises mounting a trail vehicle connector means to a slider frame, fixing the slider frame position relative to the trail vehicle during normal operation of the combination articulated vehicle, releasing the slider frame to slide relative to the trail vehicle when the combination articulated vehicle is subjected to a predetermined force, and crushing a damping material affixed to the trail vehicle using the released, sliding slider frame.

Mechanically, the present invention is a damping system that employs a damping material retained within a retaining frame that is positioned at the connection between the trail vehicle and the lead vehicle. A slider frame, slidably positioned in the retaining frame, is designed and positioned to deform the damping material as the slider frame moves. To prevent the slider frame from moving during normal operation, a shearable fastening means connects the retaining frame and the slider frame and prevents their relative displacement until exposed to a predetermined force. In addition, a connector means for connecting the trail vehicle to a lead vehicle is attached to the slider frame. Therefore, when the combination articulated vehicle experiences a collision, the fastening means shear allowing the relative displacement of the lead and trail vehicles. This relative displacement causes the slider frame to deform the damping material which absorbs the kinetic energy of the trail vehicle.

Accordingly, the objectives of this invention are to provide, inter alia, a combination articulated vehicle damping method that:

absorbs the kinetic energy of the trail vehicle during a collision;

reduces the risk to lives in an accident;

reduces damage to the vehicle and shipped goods in an accident;

reduces the cost for repair of the damage to vehicles that results from low impact collisions;

provides a passive safety system requiring no action on the part of the vehicle operator;

is low cost;

is easy to incorporate into existing vehicle designs;

is light weight and, therefore, energy efficient in implementation;

requires little or no maintenance;

provides reliable protection;

requires no modification to the tractor, flesh wheel assembly, or kingpin;

provides for greater energy absorption movement and slower deceleration than prior reference designs;

is purely mechanical, thereby, increasing effciency;

mounts on the trailer, or trail vehicle, providing ease of implementation;

distributes the load over a wider surface area than prior reference designs; and provides a safer system for transporting hazardous waste and materials.

BRIEF DESCRIPTION OF THE DRAWING

The manner in which these objectives and other desirable characteristics can be obtained is explained in the following description and attached drawings in which:

FIG. 1 is a side elevational view of a full-trailer truck incorporating the present invention.

FIG. 2 is a side elevational view of a passenger train incorporating the present invention.

FIG. 3 is a partial cross-sectional isometric view of the damping system with the slider exploded from the frame.

FIG. 4 is a partial cross-sectional front view of the damping system attached to a trail vehicle.

FIG. 5 is a partial cross-sectional view of the damping system showing the warning tag in its normal position.

FIG. 6 is a partial cross-sectional view of the damping system showing the warning tag in its warning position wherein the shear bolts are deformed.

DESCRIPTION OF THE PREFERRED EMBODIMENT

The preferred embodiment for achieving the invention is illustrated in FIGS. 1 through 6 and the combination articulated vehicle damping system is depicted as 10. In general, the invention is a method of dissipating the kinetic energy in a trail vehicle 16 of a combination articulated vehicle 10 during collision. The fundamental element for the method is crushing a damping material 40, positioned at a connection of the lead vehicle 14 and the trail vehicle 16, the connector means 18, during the collision.

Combination articulated vehicles 12, such as semi-trailer trucks, full-trailer trucks, trains and subways, and vehicles pulling trailers are comprised of two or more vehicles coupled together to form a chain of vehicles. During normal operation, the lead vehicle 14 typically pulls the trail vehicle 16. Considering the vehicles two at a time, one is always in front of the other as the vehicles move in a forward direction. Thus, the one in front may be referred to generally as the lead vehicle 14. Examples of lead vehicles 14 include a truck in a semi-trailer truck, a truck or lead trailer in a full-trailer truck, and an engine or lead car in trains and subways. Similarly, the vehicle directly behind and towed by the lead vehicle 14 may be referred to generally as the trail vehicle 16. Examples of trail vehicles 16 include a trailer in a semi-trailer truck and full-trailer truck, a car in a train or subway, a travel trailer, a horse trailer, or other types of trailer. To permit the combination articulated vehicle 12 to turn, the lead vehicle 14 and trail vehicle 16 are separated by a clearance gap. As a reference, the trail vehicle 16 has a longitudinal direction that runs from its front to its rear.

The method of dissipating the kinetic energy and reducing the damage of a collision of a combination articulated vehicle 12 involves interposing a damper at the connection of the lead vehicle 14 to the trail vehicle 16. When the combination articulated vehicle 12 endures a collision, the trail vehicle 16 releases and moves relative to the lead vehicle 14. The movement of the trail vehicle 16 slows due to the damper which absorbs the kinetic energy.

As such, the method may comprise the elements of (1) affixing the damping material 40 to the trail vehicle 16, (2) positioning a slidably mounted slider frame 50 and the damping material 40 so that, when the slider frame 50 moves relative to the trail vehicle 16 during collision, the slider frame 50 deforms the damping material 40, (3) mounting a trail vehicle connector means (such as a kingpin 20) on the slider frame 50, and (4) fastening the slider frame to prevent its relative movement until exposed to a predetermined force. Alternatively, the method elements may comprise (1) mounting a trail vehicle connector means to a slider frame 50, (2) fixing the slider frame 50 position relative to the trail vehicle 16 during normal operation of the combination articulated vehicle 12, (3) releasing the slider frame 50 to slide relative to the trail vehicle when the combination articulated vehicle 12 is subjected to a predetermined force, and (4) crushing a damping material affixed to the trail vehicle using the released, sliding slider frame 50. The method will become more clear through the following description of the preferred embodiment of the apparatus used to effectuate the method.

Basically, the combination articulated vehicle damping system 10 comprises a damping material 40 held within a damping material retaining means 30. This damping material retaining means 30 is attached to a trail vehicle 16. Slidably positioned within the damping material retaining means 30 is a slider frame 50. The slider frame 50 is designed and positioned such that, when it moves relative to the damping material retaining means 30 (or when the trail vehicle 16 moves relative to the lead vehicle 14), the slider frame 50 causes the deformation of the damping material 40. Joined to the slider frame 50 is a connector means 18 for coupling the trail vehicle 16 to the lead vehicle 14. A detailed discussion of these components and their operation follows.

A connector means 18 couples the lead vehicle 14 to the trail vehicle 16. In truck and trailer combinations, the connector means 18 comprises a kingpin 20 attached to the trail vehicle 16 that couples with a fifth wheel coupler 22 attached to the lead vehicle 14. In trains and subways, the lead vehicle 14 connects to the trail vehicle 16 with train couplers 24. Other trailers may use a simple ball hitch. To effectuate the objectives of this invention, the damping system is placed at this point of connection between the lead and trail vehicles 16.

As previously stated, attached to a forward end of the trail vehicle 16 is a damping material retaining means 30 that holds and affixes the damping material 40 to the trail vehicle 16. The method for accomplishing the attachment includes positioning the damping material 40 between a set of substantially parallel slider rails 32 attached to the bottom of the trail vehicle 16 and supporting the damping material 40 from the rear and bottom with relatively flat plates. Basically, the damping material retaining means 30 is a frame for holding a damping material 40 and for guiding a slider frame 50 during its deformation of the damping material 40. In guiding the slider frame 50, the slider rails 32 restrict the motion of the slider frame 50 to a substantially linear crushing motion and restrict the compaction of the damping material 40 to a substantially linear crush. Although the damping material retaining means 30 can take many forms, it is preferably comprised of a pair of substantially parallel slider rails 32, a support plate 34, and a back plate 36.

The slider rails 32 have a top end secured to the bottom side of the trail vehicle 16. In addition, the slider rails 32 are parallel to the longitudinal direction of the trail vehicle 16.

Adjoined to the bottom end of the slider rails 32 is the support plate 34. A slot 38 in the support plate 34 extends from the forward end of the support plate 34 and runs parallel to the longitudinal direction of the trail vehicle 16. The width of the slot 38 is sufficient to allow the connector means 18 to travel through the slot 38. By allowing the connector means 18 to travel through the support plate 34, the slider frame 50 travels more freely and better facilitates deformation of the damping material 40.

A back plate 36 is affixed to the rear end of the slider rails 32 and lies in a plane perpendicular to the longitudinal direction of the trail vehicle 16. To effectuate deformation of the damping material 40 during a collision the back plate 36 engages and supports the rear end of the damping material 40. Therefore, the back plate 36 is designed to withstand the forces of the damping material 40 during a collision.

As described, the slider rails 32, support plate 34, and back plate 36 form a frame that is designed to affix, hold, and support the damping material 40 during normal operation and during collision.

As discussed above, the damping material 40 is positioned within the damping material retaining means 30. The damping material 40 has a rear end that engages the back plate 36 of the damping material retaining means 30. Likewise, the damping material 40 has a forward end that engages a back face plate 56 of the slider frame 50. Thus, one important element of the method is installing the damping material and the slider frame so that they abut one another when in a resting position (i.e. when the relative position of the slider frame is maintained). Consequently, as the slider frame 50 moves relative to the damping material retaining means 30 toward the back plate 36 (or the trail vehicle 16 moves forward toward the lead vehicle 14), the back plate 36 and the back face plate 56 of the slider frame 50 deform the damping material 40. This deformation of the damping material 40 absorbs kinetic energy.

The material used for the damping material 40 may be any number of materials including, inter alia, foam, aluminum honeycomb, steel, fiberglass, plastic, and corrugated board. Any damping material 40 that has a controlled crush rate is suitable. A damping material 40 that crushes in one direction with no expansion in the other directions is preferred.

The length and amount of the damping material 40, and, thus, the length and size of the damping material retaining means 30 as well as the allowable slider travel, is determined by the clearance gap between the lead 14 and trail vehicles 16. To prevent the trail vehicle 16 from colliding with the trail vehicle 16, the damping material 40 length must be limited to the clearance gap plus the length of the damping material 40 when deformed less a nominal clearance space.

Slidably positioned in the damping material retaining means 30 is the slider frame 50 having a forward and rear end. The purpose of the slider frame 50 is to act as a ram and deform, or crush, the damping material 40 in the damping material retaining means 30 during a collision. Thus, the slider frame 50 is sized and designed to fit in the damping material retaining means 30 and to slide in a longitudinal direction therein. Although the slider frame 50 may take many forms, it preferably is comprised of a pair of side plates 52, a bottom plate 54, and a back face plate 56 The side plates 52 have a top end, a bottom end, a forward end, and a rear end. Further, the side plates 52 are parallel to the longitudinal direction of the trail vehicle 16. Fastened to the bottom end of the side plates 52 is the bottom plate 54. Though other configurations are possible, the connector means 18 is generally affixed to the bottom plate 54.

Positioned perpendicular to the side plates 52 and secured to their rear end is the back face plate 56 To facilitate deformation of the damping material 40, the back face plate 56 engages the forward end of the damping material 40. For the greatest efficiency, the back face plate 56 is shaped to maximize the contact surface area between it and the damping material 40. Likewise, the back face plate 56 is shaped to fit within the damping material retaining means 30 with only a small amount of clearance. For example, the figures disclose a damping material retaining means 30 with a rectangular inner chamber cross-section Therefore, the back face plate 56 has a contact face with a rectangular shape. The back face plate 56 fits within the damping material retaining means 30 with only a small amount of clearance to allow the slider frame 50 to slide.

When the combination articulated vehicle 12 is not experiencing a collision, the shearable fastening means 60 is designed to prevent the relative displacement of the slider frame 50 and the damping material retaining means 30. Thus, the relative position of the lead vehicle 14 and the trail vehicle 16 remains constant. However, when exposed to a predetermined force, the shearable fastening means 60 permits the relative displacement of the slider frame 50 and the damping material retaining means 30. The preferable material for the shear bolts is titanium because of its high endurance limit to ultimate strength ratio.

Preferably, the shearable fastening means 60 comprises one or more shear bolts positioned through substantially aligned holes 62 in the slider rails 32 and the slider frame 50 side plates 52. These bolts are designed to shear, or break, when exposed to a predetermined impact force. Thus, the fastening of the slider frame 50 may include providing at least one shear bolt constructed to fail when subjected to a predetermined force and inserting and maintaining the shear bolt(s) 63 through aligned holes 62 in the slider frame 50 and slider rails 32.

To prevent the broken pieces of the shear bolts 63 from falling into and damaging the wheels, bearings, or other combination articulated vehicle 12 components, protector plates 64 are attached to the slider rails 32 and positioned proximal to the shear bolts 63. The protector plates 64 are designed to catch or deflect the broken shear bolt pieces.

Under normal conditions, the shear bolts are sufficiently rigid to resist deformation. However, over time, cyclic loading can cause deformation and weakening of the shear bolts 63. When the shear bolts 63 become deformed, they must be replaced. Therefore, indicating deformation of the shear bolt(s) 63 is important to the safety and reliability of the damping method. To warn of shear bolt deformation, a shear bolt deformation warning tag 70 is included in the preferred embodiment.

The slider frame 50 forward end is positioned either abutting the trail vehicle 16 frame front end or relative to the trail vehicle 16 frame front end to form a gap 72 therebetween. The gap 72 width has a predetermined undeformed gap 72 width that is substantially constant when the shear bolts 63 are not deformed. The shear bolt deformation warning tag 70, the drop down tag, is maintained in a vertical position on the slider frame 50 over the gap 72. To prevent the warning tag 70 from falling through the gap 72 under normal operating conditions, the shear bolt deformation warning tag 70 has a thickness that is greater than the predetermined undeformed gap width. However, to warn of deformed shear bolts 63, the shear bolt deformation warning tag 70 has a thickness less than a minimum predetermined deformed gap width. Thus, when the shear bolts deform and the gap 72 widens to the minimum predetermined deformed gap width, the shear bolt deformation warning tag 70 falls through the gap 72 and warns of shear bolt deformation. To prevent the shear bolt deformation warning tag 70 from falling completely through the gap 72, the shear bolt deformation warning tag 70 upper end thickness is great enough to hold the shear bolt deformation warning tag 70 between the slider frame 50 and the trail vehicle 16 frame front end. An electric warning light may be used in place of the mechanical drop down tag.

In operation, with the damping material affixed to the trail vehicle lead vehicle 16, when the lead or trail vehicle 16 is subjected to an impact force (that exceeds the predetermined force), the shear bolts fail by design and allow the slider frame 50 to move relative to the damping material retaining means 30 (i.e. the lead vehicle 14 and trail vehicle 16 move relative to one another). Because the collision force is applied to the front of the lead vehicle 14 or the rear of the trail vehicle 16, the trail vehicle 16 moves forward toward the lead vehicle 14 and the slider frame back face plate 56 is driven toward the damping material retaining means back plate 36. As these two plates are forced together, they deform the damping material 40 that lies between them. It is the deformation, or crushing, of this damping material 40 that absorbs the kinetic energy of the trail vehicle 16. By absorbing the kinetic energy of the trail vehicle 14, the damper reduces the kinetic energy of the collision and the resulting damage.

While the preferred embodiment of the invention has been disclosed herein, it should be appreciated that modification of the particular embodiment of the invention may be resorted to without departing from the scope of the invention.

I claim:

1. A method of dissipating the kinetic energy stored in a trail vehicle of a combination articulated vehicle during collision comprising:

affixing a damping material to the trail vehicle;

positioning a slidably mounted slider frame and the damping material so that, when the relative position of the slider frame to the trail vehicle changes, the slider frame deforms the damping material;

mounting a trail vehicle connector means on the slider frame;

fastening the slider frame to prevent relative movement of the trail vehicle to the slider frame; and releasing the slider frame to slide relative to the trail vehicle when the combination articulated vehicle is subjected to a predetermined force.

2. The method as claimed in claim 1 further comprising:

positioning the damping material between a set of substantially parallel slider rails attached to a bottom of the trail vehicle; and supporting the damping material at a rear end and a bottom of the damping material with relatively flat plates.

3. The method as claimed in claim 2 further comprising guiding the sliding motion of the slider frame with the slider rails.

4. The method as claimed in claim 1 further comprising installing the damping material and the slider frame so that they abut one another when in a resting position.

5. The method as claimed in claim 1 further comprising crushing the damping material during collision of the combination articulated vehicle.

6. The method as claimed in claim 1 further comprising:

providing at least one shear bolt constructed to fail when subjected to the predetermined force; and inserting and maintaining the at least one shear bolt through aligned holes in the slider frame and the slider rails.

7. The method as claimed in claim 6 further comprising indicating deformation of the at least one shear bolt using a drop down warning tag.

8. A method of dissipating the kinetic energy stored in a trail vehicle of a combination articulated vehicle during collision comprising:

mounting a trail vehicle connector means to a slider frame;

fixing the slider frame relative to the trail vehicle during normal operation of the combination articulated vehicle;

releasing the slider frame to slide relative to the trail vehicle when the combination articulated vehicle is subjected to a predetermined force; and crushing a damping material affixed to the trail vehicle using the released, sliding slider frame.

9. The method as claimed in claim 8 further comprising restricting the motion of the slider frame to a substantially linear crushing motion using a pair of substantially parallel slider rails.

10. The method as claimed in claim 8 further comprising utilizing at least one shearable fastener to prevent the relative movement of the slider frame during normal operation and to release the slider frame upon application of the predetermined force.

* * * * *